(12) United States Patent
Gao et al.

(10) Patent No.: US 8,231,810 B2
(45) Date of Patent: Jul. 31, 2012

(54) COMPOSITE MATERIALS OF NANO-DISPERSED SILICON AND TIN AND METHODS OF MAKING THE SAME

(75) Inventors: Yuan Gao, Monroe, NJ (US); Marina Yakovleva, Gastonia, NC (US); John Engel, Belmont, NC (US); Daniel Diesburg, Charlotte, NC (US); Brian Fitch, Cherryville, NC (US)

(73) Assignee: FMC Corporation, Philadelphia, PA (US)

( * ) Notice: Subject to any disclaimer, the term of this patent is extended or adjusted under 35 U.S.C. 154(b) by 2283 days.

(21) Appl. No.: 11/106,225

(22) Filed: Apr. 14, 2005

(65) Prior Publication Data
US 2006/0057463 A1    Mar. 16, 2006

Related U.S. Application Data

(60) Provisional application No. 60/562,679, filed on Apr. 15, 2004.

(51) Int. Cl.
  *H01B 1/02* (2006.01)
  *H01B 1/06* (2006.01)
  *H01M 4/02* (2006.01)
  *H01M 4/13* (2010.01)
  *H01M 4/58* (2010.01)

(52) U.S. Cl. ............... 252/518.1; 252/520.1; 252/521.3; 429/209; 429/218.1; 429/231.9; 429/231.95

(58) Field of Classification Search ............... 429/218.1; 252/518.1, 520.1, 521.3
See application file for complete search history.

(56) References Cited

U.S. PATENT DOCUMENTS

| | | | |
|---|---|---|---|
| 3,271,196 | A | 9/1966 | Oswin |
| 3,508,967 | A | 4/1970 | Lyall et al. |
| 4,615,959 | A | 10/1986 | Hayashi et al. |
| 4,668,595 | A | 5/1987 | Yoshino et al. |
| 4,945,014 | A | 7/1990 | Miyabayashi et al. |
| 5,028,500 | A | 7/1991 | Fong et al. |
| 5,153,082 | A | 10/1992 | Ogino et al. |
| 5,162,176 | A | 11/1992 | Herr et al. |
| 5,286,582 | A | 2/1994 | Tahara et al. |

(Continued)

FOREIGN PATENT DOCUMENTS
DE       689 10 843       8/1989
(Continued)

OTHER PUBLICATIONS

Courtney et al. "Electrochemical and In Situ X-Ray Diffraction Studies of the Reaction of Lithium with Tin Oxide Composites", J. Electrochem. Soc., vol. 144, No. 6, 2045-2052, (Jun. 1997).*

(Continued)

*Primary Examiner* — Barbara Gilliam
*Assistant Examiner* — Steven Scully
(74) *Attorney, Agent, or Firm* — Myers Bigel Sibley & Sajovec, PA

(57) ABSTRACT

Composite compounds of tin and lithium, silicon and lithium, or tin, silicon, and lithium having tin and silicon nano-dispersed in a lithium-containing matrix may be used as electrode materials and particularly anode materials for use with rechargeable batteries. Methods of making the composite compounds include the oxidation of alloys, the reaction of stabilized lithium metal powder with tin and silicon oxides, and the reaction of inorganic salts of lithium with tin and silicon containing compounds.

6 Claims, 7 Drawing Sheets

U.S. PATENT DOCUMENTS

| | | | |
|---|---|---|---|
| 5,312,611 | A | 5/1994 | Takami et al. |
| 5,312,623 | A | 5/1994 | Plichta et al. |
| 5,543,021 | A | 8/1996 | Yazami et al. |
| 5,587,256 | A | 12/1996 | Wilson et al. |
| 5,672,446 | A | 9/1997 | Barker et al. |
| 5,707,756 | A | 1/1998 | Inoue et al. |
| 5,725,968 | A | 3/1998 | Sato et al. |
| 5,753,387 | A | 5/1998 | Takami et al. |
| 5,753,388 | A | 5/1998 | Koksbang et al. |
| 5,807,645 | A | 9/1998 | Takeuchi et al. |
| 5,948,569 | A | 9/1999 | Moses et al. |
| 5,951,919 | A | 9/1999 | Hwang et al. |
| 5,958,622 | A | 9/1999 | Kojima et al. |
| 6,156,457 | A | 12/2000 | Takami et al. |
| 6,168,885 | B1 | 1/2001 | Narang et al. |
| 6,183,911 | B1 | 2/2001 | Kweon et al. |
| 6,265,110 | B1 | 7/2001 | Rao et al. |
| 6,270,926 | B1 | 8/2001 | Yamashita et al. |
| 6,387,564 | B1 | 5/2002 | Yamashita et al. |
| 6,465,126 | B1 | 10/2002 | Jannasch et al. |
| 6,541,156 | B1 | 4/2003 | Fuse et al. |
| 6,706,447 | B2 | 3/2004 | Gao et al. |
| 7,276,314 | B2 | 10/2007 | Gao et al. |
| 2002/0119373 | A1 | 8/2002 | Gao et al. |
| 2004/0002005 | A1 | 1/2004 | Gao et al. |
| 2004/0146784 | A1 | 7/2004 | Gao et al. |
| 2005/0130043 | A1 | 6/2005 | Gao et al. |

FOREIGN PATENT DOCUMENTS

| | | |
|---|---|---|
| DE | 19532626 A1 | 3/1996 |
| EP | 0 328 131 B1 | 8/1989 |
| EP | 0763865 A1 | 1/1992 |
| EP | 0573266 A1 | 6/1993 |
| EP | 0601832 A1 | 12/1993 |
| EP | 0696075 A2 | 8/1995 |
| EP | 0696075 A3 | 8/1995 |
| GB | 2383465 A | 6/2003 |
| JP | 58-199806 | 11/1983 |
| JP | 63-13282 | 1/1988 |
| JP | 63178449 | 7/1988 |
| JP | 4-39859 | 2/1992 |
| JP | 4-126374 | 4/1992 |
| JP | 04190555 | 7/1992 |
| JP | 5-234621 | 9/1993 |
| JP | 05234621 | 9/1993 |
| JP | 10-117406 | 5/1998 |
| JP | 10-223259 | 8/1998 |
| JP | 10223259 | 8/1998 |
| JP | 10-270086 | 10/1998 |
| JP | 11-025975 | 1/1999 |
| JP | 11025975 | 1/1999 |
| JP | 11120993 | 4/1999 |
| JP | 2000-67853 | 3/2000 |
| JP | 2000164210 A | 6/2000 |
| JP | 2001229977 | 8/2001 |
| KR | 2001-0037101 | 5/2001 |
| KR | 10-2002-0003742 A | 1/2002 |
| KR | 2002029813 A | 4/2002 |
| WO | WO 00/13249 | 3/2000 |
| WO | WO 02/21632 A1 | 3/2002 |

OTHER PUBLICATIONS

Foster et al. "Nanocomposites of Sn and Li2O formed from the Chemical Reduction of SnO as Negative Electrode Material for Lithium-Ion Batteries", Electrochemical and Solid-State Letters 3(5):203-204 (2000).*

Foster et al. "Nanocomposites of Sn and $Li_2O$ Formed From the Chemical Reduction of SnO as Negative Electrode Material for Lithium-Ion Batteries", *Electrochemical and Solid-State Letters* 3(5):203-204 (2000).

Li et al. "Studies on Capacity Loss and Capacity Fading of Nanosized SnSb Alloy Anode for Li-Ion Batteries", *J. of Electrochemical Society* 148(8):A915-A922 (2001).

Mao et al. "Active/Inactive Nanocomposites as Anodes for Li-Ion Batteries", *Electrochemical and Solid-State Letters* 2(1):3-5 (1999).

Notification of Transmittal of the International Search Report and the Written Opinion of the International Searching Authority, or the Declaration corresponding to PCT/US2005/012848 mailed on Aug. 28, 2006.

"Microencapsulation of Lithium", *U.S. Dept. of Commerce National Technical Information Service* (Dec. 31, 1985) 68 pages.

Kwon et al. "Characteristics of a lithium-polymer battery based on a lithium powder anode", *J. of Power Sources* 93:145-150 (2001).

U.S. Appl. No. 10/900,715, filed Jul. 28, 2004, Gao et al.

U.S. Appl. No. 10/324,611, filed Dec. 20, 2002, Gao et al.

Notification of Transmittal of the International Search Report and the Written Opinion of the International Searching Authority, or the Declaration, PCT/US2004/24502, Dec. 7, 2004.

Notice to Submit Response to the Examination Report corresponding to Korean Patent Application No. 10-2002-0023709 mailed Sep. 28, 2006.

European Search Report corresponding to Great Britain application No. GB 0209424.1; Date of Mailing: Jul. 11, 2002.

Search and Examination Report corresponding to Great Britain Application No. GB0703754.2 dated Jun. 22, 2007.

Huang et al. "Electrochemical characteristics of $Sn_{1-x}Si_xO_2$ as anode for lithium-ion batteries", *J. of Power Sources* 81-82:362-367 (1999)

"WordNet Search", WordNet. Mar. 20, 2008 http://wordnet.princeton.edu.

International Programme on Chemical Safety, n-Hexane Data Sheet 0279, Apr. 2000.

Examination Report corresponding to Great Britain Application No. 0617130.0 mailed Dec. 30, 2008.

Russian Office Action corresponding to Russian Application No. 2006140247 mailed Oct. 9, 2008.

Examination Report corresponding to Great Britain Application No. 0617130.0 mailed Oct. 16, 2008.

Examination Report corresponding to European Application No. 05856612.6 dated Mar. 16, 2010.

Canadian Office Action corresponding to Canadian Application No. 2384494 dated Mar. 10, 2009.

Search Report corresponding to French Application No. 0205144 dated May 15, 2009.

Li et al. "Studies on Capacity Loss and Capacity Fading of Nanosized SnSb Alloy Anode for Li-Ion Batteries", *Journal of the Electrochemical Society* 148(8):A915-A922 (2001).

Yang et al. "New Approaches to Anode Materials for Lithium Ion Batteries", pp. 488-489 (2005).

Alcantara et al. "Nanodispersed iron, tin and antimony in vapour grown carbon fibres for lithium batteries: an EPR and electrochemical study", *Carbon* 42(11):2153-2161 (2004).

Office Action corresponding to Japanese Application No. 2007-508565 dated Sep. 16, 2011.

Office Action corresponding to Canadian Application No. 2558804 dated Jul. 13, 2011.

Non-Final Rejection corresponding to Korean Application No. 10-2006-7021068 dated Sep. 19, 2011.

Supplementary Search and Examination Report corresponding to Great Britain Application No. 04779517 dated Feb. 20, 2009.

* cited by examiner

COMPOSITE MATERIALS OF NANO-DISPERSED SILICON AND TIN AND METHODS OF MAKING THE SAME

CROSS-REFERENCE TO RELATED APPLICATIONS

This application claims the benefit of, and incorporates herein by reference in its entirety, the following U.S. Provisional Application: U.S. Provisional Application No. 60/562,679, filed Apr. 15, 2004.

FIELD OF THE INVENTION

The present invention relates to compounds that may be used in the formation of batteries and more particularly to composite compounds used in the formation of electrodes and to methods of forming such compounds.

BACKGROUND OF THE INVENTION

Graphite is currently used as an anode material in lithium-ion batteries. The maximum theoretical capacity of a graphite anode is 372 mAh/g. In an attempt to improve the capacity of anodes, the researchers at Fujifilm Celltec Co. performed research on a new generation of lithium-ion cells employing amorphous tin-based composite oxide glasses as anode materials, which exhibited potentially large capacities (Y. Idota, A. Matsufuji, Y. Maekawa, and T. Miyasaki, Science, 276, 1395 (1997)). A number of research activities have been focused on tin-containing anode materials since then. However, despite all of such efforts, graphite is still the preferred material used in commercial lithium-ion batteries.

It is our understanding that the Fujifilm materials are essentially composites of various active tin oxides in other inactive oxides. According to earlier researches on the subject (see for example, I. A. Courtney and J. R. Dahn, J. Electrochem. Soc., 144, 2045 (1997); I. A. Courtney, W. R. McKinnon and J. R. Dahn, J. Electrochem. Soc., 146, 59 (1999)), when lithium electrochemically enters an anode formed from such materials during a first charge of a battery, the lithium reacts with oxygen in the tin oxide to form lithium oxide and the tin in the tin oxide becomes elemental tin nano-dispersed in situ in the framework of the lithium oxide. The lithium that reacts with the oxygen during the first charge, however, is lost and will not participate in any further electrochemical cycling within the practical voltage window of the battery. The consumed lithium results in an irreversible capacity loss for the battery. During subsequent cycling, the capacity of the battery is provided by the nano-dispersed tin that is alloyed and de-alloyed in an alloying process. The non-participating atoms in the glass (also called "spectator" atoms) provide the framework to absorb the large volume changes associated with the alloying process. Therefore, the more oxygen that is reacted with lithium in the material during the first charging cycle, the larger the irreversible capacity. The more inactive non-participation atoms (spectators) in the composite material, the better the cycle life. There is, however, a resulting lower reversible capacity.

For example, the earlier reported tin-containing glass materials typically exhibit more than 50% irreversible capacity, and have very poor cycle life unless the capacity is reduced to a level very similar to that of graphite by the addition of large amounts of inactive atoms in the oxide glass such as $B_2O_5$ and $P_2O_5$ clusters. Because of large irreversible capacity exhibited by such materials and poor structural stability, these materials are typically not used in commercial lithium ion cells.

In recent years, the focus of tin-based anode material research has shifted away from the oxide materials in favor of intermetallic alloy materials, such as Cu—Sn systems, Fe—Sn—C systems, Mo—Sn alloys, and the like. The intermetallic alloys, however, must be produced in oxygen free environments to control irreversible capacity losses. In addition, such materials are typically produced with high energy ball milling in an argon environment, which is expensive. The capacities of such materials are typically very similar to or even below those of graphite. The potential benefits of these materials are that a) the tin-based materials should be safer than graphite because the binding energy between tin and lithium is larger than that between graphite and lithium, and therefore the tin-based materials are less reactive with electrolytes during thermal abuses of the battery in the charged state; and b) the true density of the tin alloys are generally about twice of that of graphite and therefore the volumetric energy density of battery can be improved by employing such materials even if the specific capacity of the materials are the same as graphite.

Another suggested approach for forming anode materials includes reacting $Li_3N$ with SnO to obtain a composite of tin nano-dispersed in $Li_2O$ (D. L. Foster, J. Wolfenstine, J. R. Read, and W. K. Behl, Electrochem. Solid-state Lett. 3, 203 (2000)). However, because of the low reactivity between $Li_3N$ and SnO (the Li—N bond must be broken), it takes about 5 days of high energy ball milling for the reaction to occur, which is undesirable from a commercial processing standpoint.

Tin and silicon can each alloy with 4.4Li, and they each exhibit very large theoretical capacities of 990 mAh/g and 4200 mAh/g, respectively. Therefore, it is desirable to develop methods for incorporating such materials into electrodes for use with rechargeable batteries. It is also desirable to develop processes capable of producing tin and silicon containing compositions that may be used with electrodes.

SUMMARY OF THE INVENTION

According to some embodiments of the present invention, compounds that may be used in the formation of electrodes, such as anodes and cathodes, include lithium-containing compounds (e.g., lithium oxides) having tin nano-dispersed therein, lithium-containing compounds having silicon nano-dispersed therein, and lithium-containing compounds having tin and silicon nano-dispersed therein. The composite lithium oxide compounds having tin, silicon, or tin and silicon nano-dispersed therein may be formed prior to use as an electrode material.

According to other embodiments of the present invention, tin or silicon nano-dispersed lithium-containing compounds are formed by the reaction of a lithium metal powder with a tin-oxide, a silicon-oxide, or both tin-oxide and silicon-oxide. The resulting compounds may be single phase, two-phase, or multi-phase compounds.

In still other embodiments of the present invention, compounds that may be used in the formation of electrodes include lithium-containing compounds having tin, silicon, or both tin and silicon nano-dispersed therein. The lithium-containing compounds may include, for example, lithium fluoride, lithium carbonate, lithium silicate, lithium phosphate, and lithium sulfate.

According to other embodiments of the present invention, an alloy powder of lithium and tin, lithium and silicon, or lithium, tin, and silicon is subjected to controlled oxidation to form a matrix of lithium oxide having tin, silicon, or tin and silicon dispersed therein.

In still other embodiments of the present invention, an electrode is formed from a tin, silicon, or tin and silicon containing lithium matrix material wherein the lithium matrix is formed prior to the formation of the electrode. For instance, a lithium matrix, such as lithium oxide, may be formed from the reaction of a stabilized lithium metal powder with a tin oxide or silicon oxide ex situ of the electrode formation process.

BRIEF DESCRIPTION OF THE DRAWING FIGURES

The invention can be more readily ascertained from the following description of the invention when read in conjunction with the accompanying figures in which.

Figure 3:
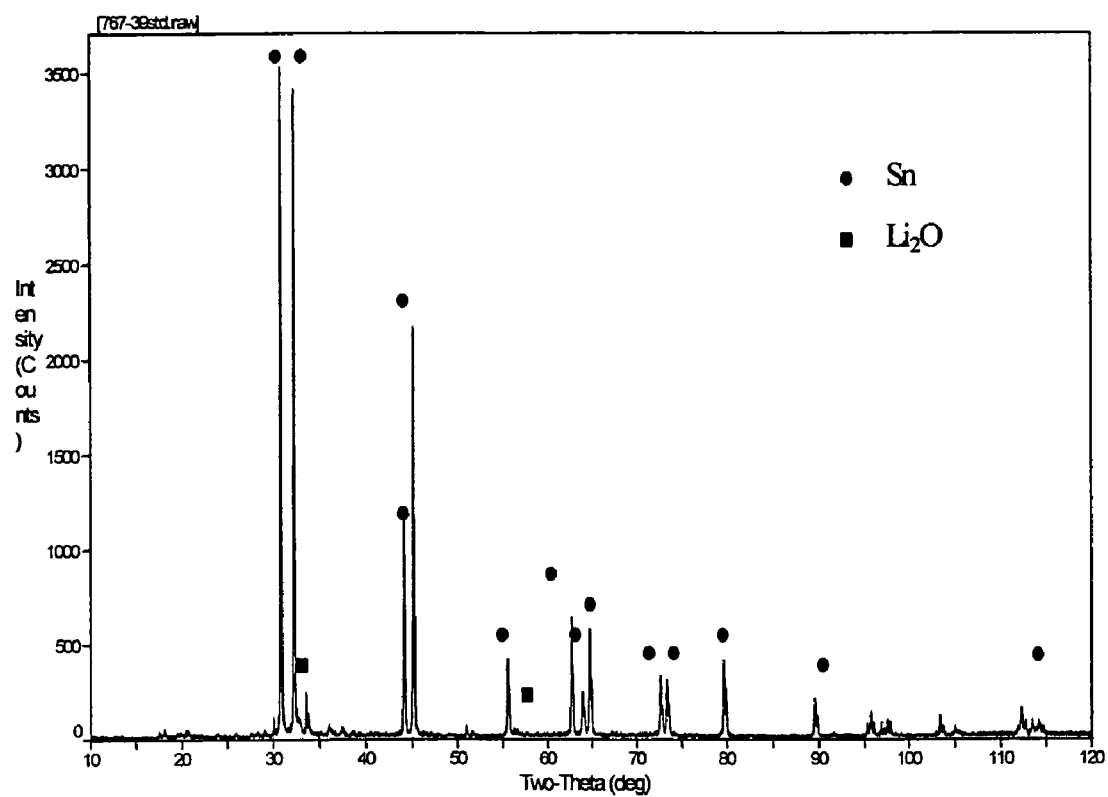

FIG. 3. illustrates an XRD pattern for the Sn:Li$_2$O composite material according to Example 2.

Figure 4:
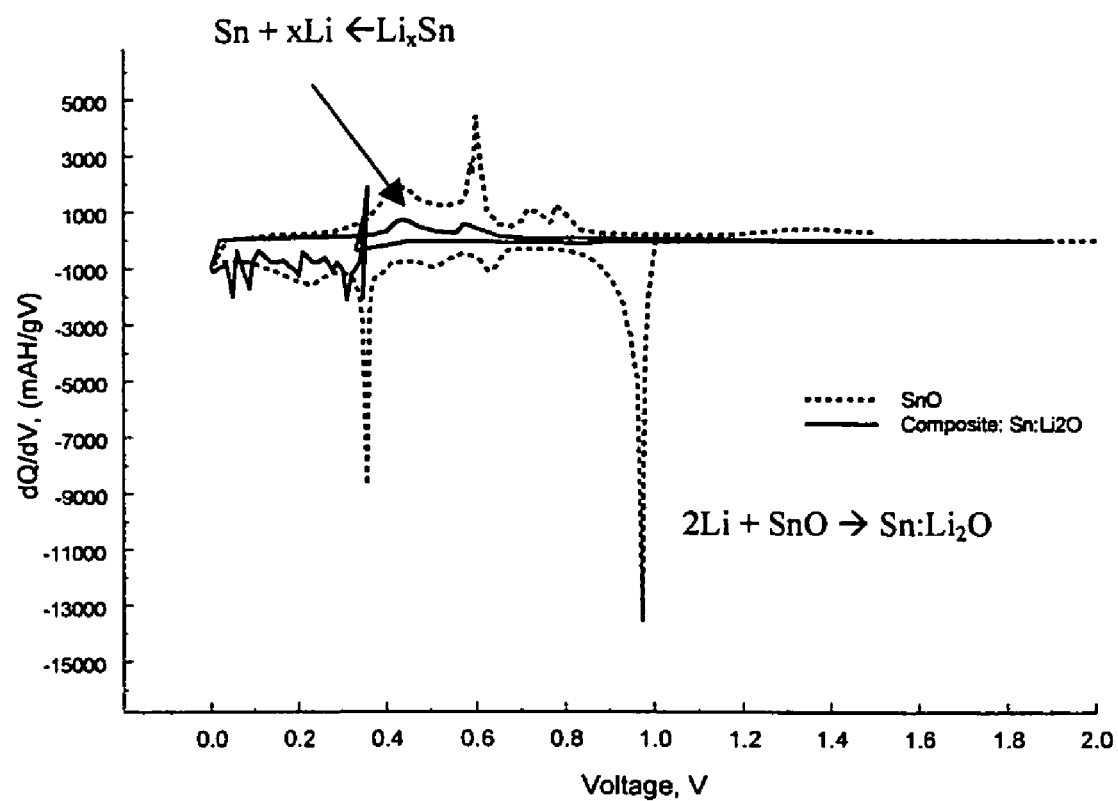

FIG. 4 illustrates a cyclic voltamogram of an electrode formed according to Example 2 and an electrode formed from tin oxide in accordance with Example 2.

Figure 5:
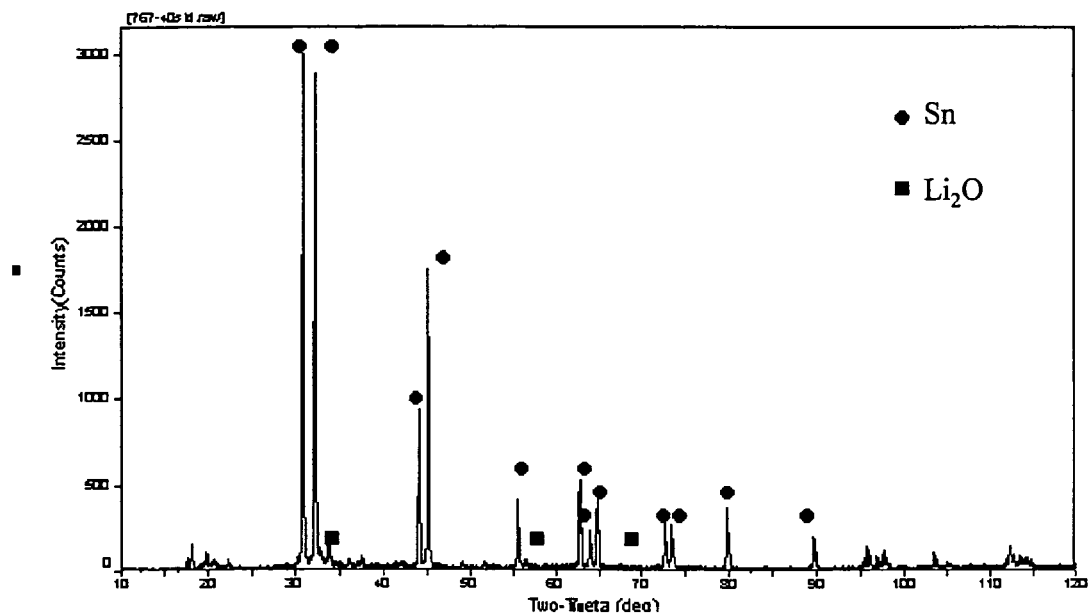

FIG. 5. illustrates an XRD pattern for the Sn:2Li$_2$O composite material according to Example 3.

Figure 6:
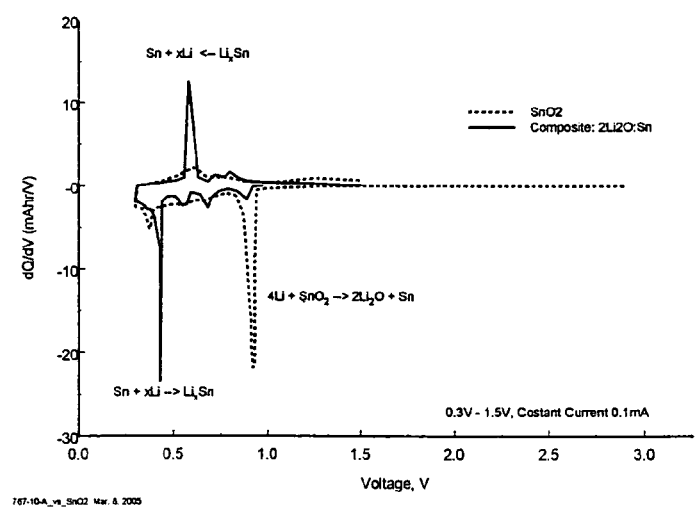

FIG. 6 illustrates a cyclic voltamogram of an electrode formed according to Example 3 and an electrode formed from tin oxide in accordance with Example 3.

Figure 7:
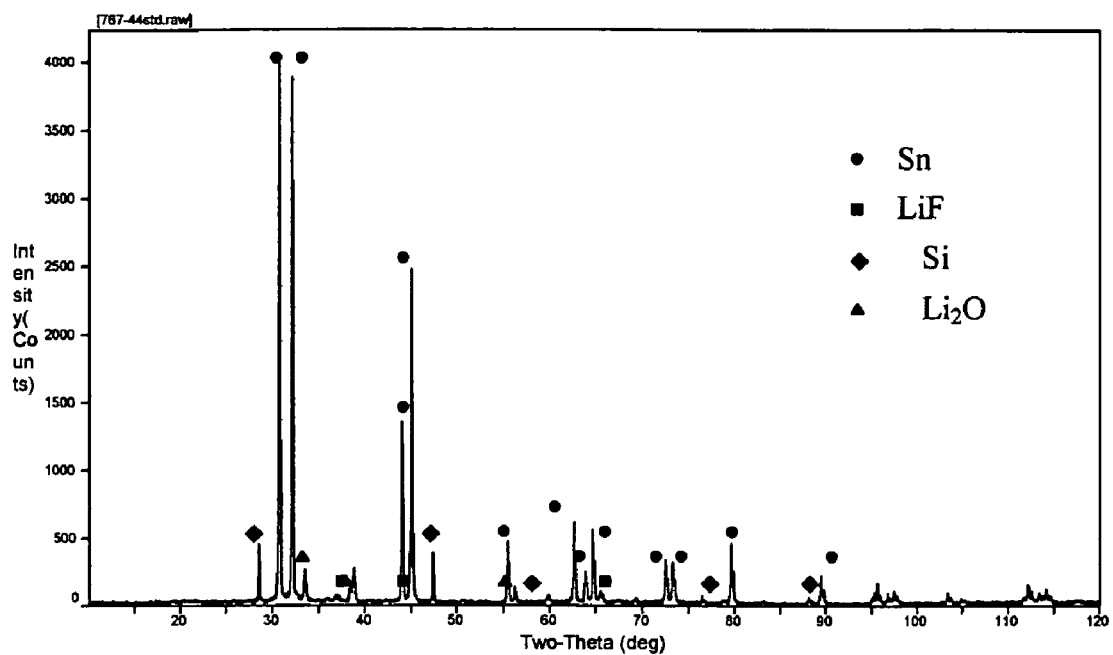

FIG. 7 illustrates an XRD pattern for the Si:Sn:2LiF:Li$_2$O composite material according to Example 4.

Figure 8:
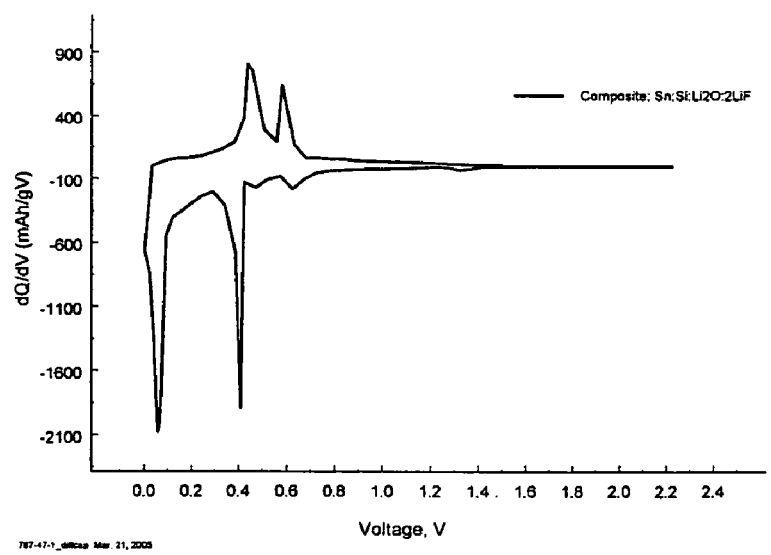

FIG. 8 illustrates a cyclic voltamogram of an electrode formed according to Example 4 and an electrode formed from SnF$_2$ and SiO in accordance with Example 4.

Figure 9:
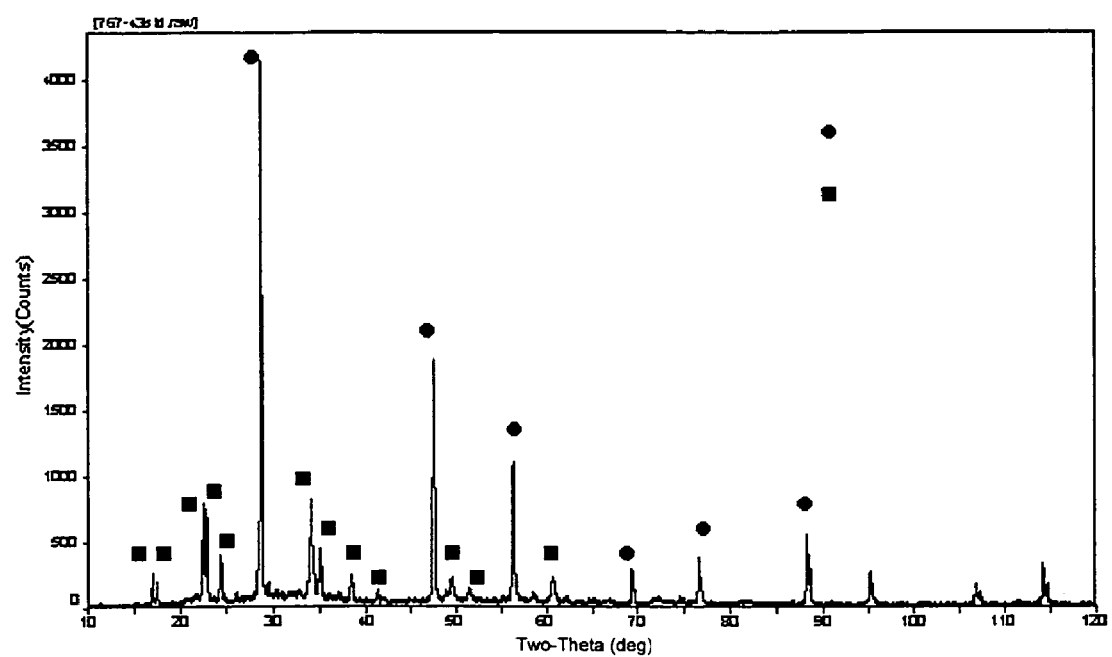

FIG. 9. illustrates an XRD pattern for the 3Si:L$_4$SiO$_4$ composite material according to Example 5.

DETAILED DESCRIPTION OF THE INVENTION

The present invention now will be described more fully hereinafter with reference to the accompanying drawing, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

According to some embodiments of the present invention, compounds that may be used in the formation of electrodes, such as anodes and cathodes, comprising lithium-containing compounds including lithium oxide compounds having tin nano-dispersed therein, lithium oxide compounds having silicon nano-dispersed therein, and lithium oxide compounds having tin and silicon nano-dispersed therein. The composite lithium oxide compounds having tin, silicon, or tin and silicon nano-dispersed therein may be formed prior to use as an electrode material.

According to embodiments of the present invention, an electrode, such as an anode for use in lithium-ion batteries, includes a composite compound of lithium such as lithium oxide having tin nanoparticles suspended therein. The formation of an electrode with a composite compound of lithium oxide having tin nanoparticles suspended therein produces an electrode wherein the tin nanoparticles may react with available lithium in a lithium battery on a reversible capacity basis. Electrodes containing composite compounds of lithium oxide having tin nanoparticles dispersed therein provide improved capacities for batteries using the electrodes and do so with significantly reduced irreversible capacity losses suffered by electrodes formed with tin oxide compounds. In addition, the presence of the lithium oxide matrix provides a stable structure for an electrode, allowing the electrode to be cycled repeatedly without significant degradation.

In other embodiments, an electrode includes a composite compound of lithium such as lithium oxide having silicon nanoparticles suspended therein. As with tin nanoparticle containing lithium oxide materials, the silicon nanoparticle containing lithium oxides provide improved capacities for electrodes using such materials. Electrodes formed with a composite compound of lithium oxide having silicon nanoparticles suspended therein provide improved capacities to the batteries with which they are used. In addition, the presence of the lithium oxide matrix provides a stable structure for an electrode, allowing the electrode to be cycled repeatedly without significant degradation.

In still other embodiments, an electrode includes a composite compound of lithium oxide having tin and silicon nanoparticles suspended therein. Electrodes formed with a composite compound of lithium oxide having both tin and silicon nanoparticles suspended therein provide improved capacities to the batteries with which they are used. In addition, the presence of the lithium oxide matrix provides a stable structure for an electrode, allowing the electrode to be cycled repeatedly without significant degradation.

Embodiments of the present invention also include batteries utilizing electrodes formed from composite compounds of lithium oxide having tin, silicon, or tin and silicon nanoparticles suspended therein. Exemplary batteries include batteries for cellular phones, portable computers, digital cameras, personal digital assistants, power tools, hybrid electric vehicles and the like. In some embodiments, the electrodes formed from the compounds of embodiments of the present invention are preferably anodes.

According to other embodiments of the present invention, tin or silicon nano-dispersed lithium oxide compounds are formed by the reaction of a lithium metal powder with a tin-oxide, a silicon-oxide, or both tin-oxide and silicon-oxide. The resulting compounds may be single phase, two-phase, or multi-phase compounds.

A composite compound of lithium oxide having tin nanoparticles dispersed therein may be formed by reacting lithium metal with a tin oxide material. The lithium metal may include a stabilized lithium metal powder such as that produced by FMC, Inc. and described in U.S. Pat. Nos. 5,776,369, and 5,567,474, the disclosures of which are incorporated herein by reference in their entirety. The tin oxide material may include tin oxides, such as tin(II) or tin(IV), or a lithium-containing tin oxide material. The reaction of lithium metal with a tin oxide to form lithium oxide with tin nanoparticles dispersed or suspended therein is accomplished by the mixing of lithium metal with tin oxide. When mixed, the tin oxide reacts with the lithium metal to form a lithium oxide having tin nanoparticles suspended therein. For example, the following reaction formulas are examples of reactions used according to embodiments of the present invention to form lithium oxides having tin nanoparticles suspended therein:

$2Li + SnO \rightarrow Sn:Li_2O$ $4Li + SnO_2 \rightarrow Sn:2Li_2O$ $4Li + Li_2SnO_3 \rightarrow Sn:3Li_2O$ In each of the preceding reaction formulas, the resulting composite composition includes tin (Sn) nano-dispersed in the framework of the lithium oxide ($Li_2O$).

Similarly, a composite compound of lithium oxide having silicon nanoparticles dispersed therein may be formed by reacting lithium metal with a silicon oxide material. The lithium metal may include a stabilized lithium metal powder such as that produced by FMC, Inc. The silicon oxide material may include silicon oxide or lithium-containing silicon oxides. The reaction of lithium metal with a silicon oxide to form lithium oxide with silicon nanoparticles dispersed or suspended therein is accomplished by the mixing of lithium metal with silicon oxide. When mixed, the silicon oxide reacts with the lithium metal to form a lithium oxide having silicon nanoparticles suspended therein. For example, the following reaction formulas are examples of reactions used according to embodiments of the present invention to form lithium oxides having silicon nanoparticles suspended therein:

$4Li + 4SiO \rightarrow 3Si:Li_4SiO_4$

In each of the preceding reaction formulas, the resulting composite composition includes silicon (Si) nano-dispersed in the framework of the lithium oxide ($Li_2O$).

Composite compounds having both tin and silicon nanoparticles dispersed therein may be formed by reacting lithium metal with a tin oxide material and silicon oxide material. The lithium metal may include a stabilized lithium metal powder such as that produced by FMC, Inc. The tin oxide material may include tin oxides or lithium containing tin oxides. Similarly, the silicon oxide material may include silicon oxides or lithium containing silicon oxides. The reaction of lithium metal with tin oxide and silicon oxide to form lithium oxide with tin and silicon nanoparticles dispersed or suspended therein is accomplished by the mixing of lithium metal with tin oxide and silicon oxide. When mixed, the tin oxide and silicon oxide react with the lithium metal to form a lithium oxide having tin and silicon nanoparticles suspended therein. For example, the following reaction formula is an example of a reaction according to embodiments of the present invention that forms lithium oxides having tin and silicon nanoparticles suspended therein:

$6Li + SiSnO_3 \rightarrow SiSn:3Li_2O$ $4Li + SnF_2 + SiO \rightarrow Si:Sn:2LiF:Li_2O$ In the preceding reaction formula, the resulting composite composition includes tin and silicon nano-dispersed in the framework of the lithium oxide.

The tin, silicon, and tin-silicon nanoparticle containing lithium oxide compounds formed according to embodiments of the present invention also contribute to the cycle life of electrodes formed from such compounds. The lithium oxide matrix of the compounds is capable of absorbing the volumetric changes that occur in an electrode during cycling. This ability to absorb such changes helps to maintain the integrity of an electrode formed from such materials. In addition, the lithium oxides of the compounds act as spectator atoms when the compounds are used to form electrodes. Spectator atoms in an electrode are atoms that do not react with lithium during the cycling of an electrode made from the compounds. The presence of spectator atoms is related to the ability of an electrode to maintain a good cycle life. In addition, the lithium oxides of the compounds is relatively light, providing a light framework for electrodes made from the compounds of the present invention.

Examples of some compounds of embodiments of the present invention are listed in Table 1. The theoretical capacity (mAh/g) of the compounds and the number of spectator atoms present in the compounds are also listed. The compounds are also compared to graphite, a common material used in the formation of electrodes, and especially anodes.

TABLE 1

| Compound | Precursor | Theoretical Capacity (mAh/g) | Number of Spectators |
|---|---|---|---|
| Graphite | — | 372 | — |
| Sn:Li$_2$O | SnO | 791 | 3 |
| Sn:2Li$_2$O | SnO$_2$ | 658 | 6 |
| Sn:3Li$_2$O | Li$_2$SnO$_3$ | 565 | 9 |
| Si:2Li$_2$O | SiO$_2$ | 1339 | 6 |
| Si:3Li$_2$O | Li$_2$SiO$_3$ | 999 | 9 |
| SiSn:3Li$_2$O | SiSnO$_3$ | 994 | 4.5 * |

* per each Si or Sn atom

According to embodiments of the present invention, the compounds may also include other tin and silicon containing mixed oxides or alloy compounds. For example, single phase composite compounds having a structure represented by the formula:

$Sn_{1-x}Si_x:\alpha Li_2O$ wherein $0 \leq x \leq 1$ and $1 \leq \alpha \leq 3$ may be formed according to embodiments of the present invention. In addition, two-phase composite compounds such as those represented by the following formula may also be formed:

$Sn_{1-x}Si_x:\alpha Li_2O + \gamma Sn_{1-y}Si_y:\beta Li_2O$ wherein $0 \leq x \leq 1$, $1 \leq \alpha \leq 3$, $0 \leq y \leq 1$, $1 \leq \beta \leq 3$, and $0 \leq \gamma \leq 1$. In still other embodiments of the present invention, the compounds may include multiple phases with various tin, silicon, and lithium oxide contents.

In some embodiments of the present invention, the lithium metal reacted with a tin oxide, a silicon oxide, or both tin oxides and/or silicon oxides to form composite lithium oxide compounds having tin, silicon, or tin and silicon nanoparticles suspended therein is preferably a stabilized lithium metal powder. For example, a stabilized lithium metal powder as produced by FMC, Inc. The use of a stabilized lithium metal powder during the reactions with tin oxides and silicon oxides provides improved safety over other processes using unstabilized lithium metal. In addition, stabilized lithium metal powder can be used with embodiments of the present invention without the need for specialized processing steps to ensure that the lithium metal does not react adversely to the reaction environment.

The surfaces of the composite compositions according to embodiments of the present invention may also be passivated such that the composite compositions are safe to handle and use. For instance, passivation of a composite composition may be accomplished by reacting the composite composition with carbon dioxide to form a lithium carbonate passivation layer. The existence of a passivation layer allows the composite compounds to be more easily and safely handled during electrode fabrication processes.

Experiments on the compounds according to embodiments of the present invention indicate that electrodes formed from the compounds of the present invention do not undergo the large irreversible capacity losses suffered by electrodes formed with tin and silicon oxides. In addition, electrodes formed from compounds according to embodiments of the present invention have large reversible capacities, which allow the lithium in a battery to alloy and de-alloy with the tin, silicon, or tin and silicon nanoparticles in the compounds according to embodiments of the present invention.

Stabilized lithium metal powder, such as that available from the assignee, and is exemplified in U.S. Pat. Nos. 5,567, 474; 5,776,369; and 5,976,403, the disclosures of which are incorporated herein by reference in their entirety, undergo a wide spectrum of chemical reactivity with tin oxides and silicon oxides, including tin(II), tin(IV), Si(II), and silicon (IV) oxides. The chemical reactivity of the stabilized lithium metal powder with the oxides ranged from almost uncontrollable (with tin(II) oxides) to little or no reactivity with silicon (IV) oxide at room temperature. To help control the reactions, the reaction conditions may be modified. For example, reaction temperatures may be altered or selected reaction modulators may be added to the reaction to control the reaction conditions. For instance, the highly reactive tin(II) oxide may be mixed with silicon(IV) oxide and the mixture reacted with stabilized lithium metal powder. The reaction of the mixture and the stabilized lithium metal powder can be better controlled because the tin(II) oxide acts as a promoter for the reaction of the silicon(IV) oxide. By careful selection of the reaction conditions, reaction components, and reaction parameters, compounds according to embodiments of the present invention may be formed having particular mixtures of tin and silicon nanoparticles in a lithium oxide stabilizing matrix.

According to embodiments of the present invention, a tin and/or silicon precursor compound may be reacted with an inorganic salt of lithium to create a composite compound having tin or silicon nanoparticles suspended or dispersed in a matrix of an inorganic lithium salt. The composite compounds formed according to embodiments of the present invention may be used to form electrodes, such as anodes, for use in batteries.

Precursor compounds used with embodiments of the present invention may include tin and/or silicon containing compounds such as inorganic salts of tin, inorganic salts of silicon, or inorganic salts of tin and silicon. Some examples of precursor compounds that may be used with embodiments of the present invention include, but are not limited to, tin, tin fluorides, tin carbonates, silicon, silicon fluorides, and silicon carbonates.

Inorganic salts of lithium used with embodiments of the present invention preferably include inorganic salts of lithium having a strong acid anion that is insoluble in electrolyte solvents, and especially insoluble in electrolyte solvents used in batteries. Exemplary anions include but are not limited to $O_2^-$, $(CO_3)^{2-}$, $F^-$, $PO_4^{3-}SiO_4^{2-}SO_4^{2-}$. For example, inorganic salts of lithium used with embodiments of the present invention may include lithium fluoride, lithium carbonate, lithium phosphate, lithium silicate, or lithium sulfate. The inorganic salt of lithium may be reacted with one or more precursor compounds to form a composite compound having tin and/or silicon nanoparticles suspended or dispersed in a matrix of the inorganic lithium salt.

For example, a fluoride containing precursor compound of tin and/or silicon may be reacted with a lithium-containing compound to form a composite compound represented by the formula:

$$Sn_{1-x}Si_x:\alpha LiF$$

wherein $0 \leq x \leq 1$ and $2 \leq \alpha \leq 4$. In other embodiments, a carbonate containing precursor compound of tin and silicon may be reacted with a lithium-containing compound to form a composite compound represented by the formula:

$$Sn_{1-x}Si_x:\alpha Li_2CO_3$$

wherein $0 \leq x \leq 1$ and $1 \leq \alpha \leq 3$. The structures of the composite compounds according to embodiments of the present invention may be structurally single phase or multiple phases with various tin, silicon, and lithium-containing compound contents.

A carbonate based composite compound according to embodiments of the present invention may also be formed by allowing a lithium oxide based composite compound according to embodiments of the present invention to react with carbon dioxide, thereby turning the lithium oxide compound to a lithium carbonate compound.

According to other embodiments of the present invention, an alloy powder of lithium and tin, lithium and silicon, or lithium, tin, and silicon is subjected to controlled oxidation to form a matrix of lithium oxide having tin, silicon, or tin and silicon dispersed therein.

Alloy powders of lithium and tin, lithium and silicon, or lithium, tin, and silicon that may be used with embodiments of the present invention may be formed in any number of ways known for forming alloys, such as by the industrial practices of ball milling the compounds to form an alloy or atomization spray of a molten alloy mixture. For example, an alloy powder of tin, silicon, and lithium represented by the formula:

$$Sn_{1-x}Si_xLi_{2\alpha}$$

wherein $0 \leq x \leq 1$, and $1 \leq \alpha \leq 4$, may be formed according to embodiments of the present invention. The compositions of the alloys formed and used according to embodiments of the present invention may be controlled by controlling the amounts of different compounds used to form the alloys. In addition, the surfaces of the alloys formed according to embodiments of the present invention may be passivated, such as by reacting with carbon dioxide, to improve the handling qualities and safety of the powders.

In one embodiment of a mixture of lithium metal and silicon, tin, or a mixture of silicon-tin powder are heated up in a vessel under an inert gas such as argon to 800° C. with vigorous stirring to form a molten alloy. An alloy powder is made through the spray atomizer by spraying the molten alloy through a nozzle into an Ar filled chamber and the cooled powder is collected in a pan. The molar ratio of lithium and silicon tin, or mixture of silicon-tin can be adjusted depending on the desired composition of the final product.

For example, if the final product is targeted to be $Si:3Li_2O$ or $Si:3Li_2CO_3$, the initial lithium to silicon ratio in the molten alloy should be 6:1. If the final product is targeted to be $Li_{4.4}Si:3Li_2O$ or $Li_{4.4}Si:3Li_2CO_3$, the initial lithium to silicon ratio in the molten alloy should be 10.4:1. As the temperature drops below about 630° C. in flight of the molten droplet, the $Li_{4.4}Si$ phase solidifies first and precipitates out as nano-particles in the molten lithium. As the temperature drops further in flight to below the lithium melting point about 180° C., the whole droplet solidifies forming a particle with nano $Li_{4.4}Si$ imbedded in lithium.

Once the solid powder is collected, it can be converted to $Li_ySi:\alpha Li_2O$, $Li_ySi:\alpha Li_2CO_3$, $Li_ySi:2\alpha LiF$, ($0 \leq y \leq 4.4$, and $1 \leq \alpha \leq 4$) or nano lithium silicon or silicon imbedded in other lithium salts, by using controlled atmospheric conversion or appropriate chemical agents, in either solid gas phase or solid liquid phase reactors.

Composite compounds having tin, silicon, or tin and silicon dispersed in a lithium-containing matrix may be formed from tin, silicon, and lithium containing alloys according to embodiments of the present invention. The composite compounds may be formed by subjecting a tin and lithium containing alloy, a silicon and lithium containing alloy, or a tin, silicon, and lithium containing alloy to controlled oxidation to selectively oxidize the components of the alloy. The oxidation of the alloy may be controlled such that only a portion of the lithium, all of the lithium, a portion of the tin or silicon, or all of the lithium and some of the tin and/or silicon is oxidized. Alternatively, controlled fluorination or controlled carbonation to form a lithium fluoride or lithium carbonate, respectively, can be used.

Lithium exhibits a larger change in chemical potential than tin and silicon and therefore oxidizes before tin and silicon will. The oxidation fluorination or carbonation of an alloy powder according to embodiments of the present invention can therefore be controlled by limiting the amount of oxygen, fluorination or carbonation to which the alloy is exposed. By controlling the composition of the alloy powder and the degree of subsequent oxidation, fluorination or carbonation of the alloy powder, the structure and chemical make-up of the composite compounds of embodiments of the present invention may be controlled. Composite compounds having particular amounts of lithium oxide, fluoride or carbonate, tin and silicon may be formed.

For example, a lithium, tin, and silicon alloy powder represented by the formula $Sn_{1-x}Si_xLi_{2\alpha}$ ($0 \leq x \leq 1$ and $1 \leq \alpha \leq 4$) may be oxidized in an oxygen-starved controlled environment such that only the lithium in the alloy is oxidized and the $Sn_{1-x}Si_x$ ($0 \leq x \leq 1$) remains dispersed in the lithium oxide matrix.

In another example, a lithium, tin, and silicon alloy powder represented by the formula $Sn_{1-x}Si_xLi_{2\alpha}$ ($0 \leq x \leq 1$ and $1 \leq \alpha \leq 4$) may be oxidized such that only a portion of the lithium in the alloy powder is oxidized. The resulting composite compound according to embodiments of the present invention is represented by the formula:

$$Li_ySn_{1-x}Si_x:\alpha Li_2O$$

wherein $0 \leq y \leq 4.4$, $0 \leq x \leq 1$, and $1 \leq \alpha \leq 4$. When used to form an electrode, this composite compound provides the electrode with an inactive lithium oxide matrix having good mechanical and cycle stability. In addition, the additional lithium in the composite compound provides the electrode with a source of lithium that can be used in a battery.

The surfaces of the composite compositions according to embodiments of the present invention may be passivated such that the composite compositions are safe to handle and use. For instance, passivation of a composite composition may be accomplished by reacting the composite composition with carbon dioxide to form a lithium carbonate passivation layer. The existence of a passivation layer allows the composite compounds to be more easily and safely handled during electrode fabrication processes.

The composite compounds of the present invention may be used to form electrodes, such as anodes, for use with batteries. Electrodes formed from the composite compounds according to embodiments of the present invention may be formed using methods and processes known for forming electrodes. For instance, processes for forming electrodes such as those disclosed in U.S. Pat. No. 6,706,447 and U.S. Published patent application No. 20040002005, the disclosures of which are incorporated herein by reference in its entirety, may be used.

Electrodes formed from composite compounds according to embodiments of the present invention experience smaller irreversible capacities than other electrodes formed with tin or silicon oxides and have large reversible capacities provided by the nanoparticles of tin, silicon, or tin and silicon dispersed in the lithium containing matrixes of the compounds. The large reversible capacities provide improved capacity and performance capability for batteries using electrodes formed from the compounds according to embodiments of the present invention.

The following Examples are provided to illustrate various embodiments of the present invention but are not meant to limit the embodiments of the present invention in any way.

EXAMPLES

Example 1

The Sn:2LiF composite was generated according to the following reaction:

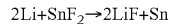

Materials preparation: $SnF_2$ (99%, Aldrich) was used with stabilized lithium metal powder (SLMP) from FMC Corporation.

First, 1.0 g $SnF_2$ was combined with 0.093 g SLMP. There was five percent excess in SLMP to account for the protective coating on the SLMP particle surface and thereby to insure the completion of the reaction. Materials were weighed and premixed in an Argon filled glove box. Premixing was done with a soft brush to avoid initiating any reaction on contact. After premixing the materials were loaded into a 50 ml stainless steel ball mill jar along with ten 10 mm stainless steel balls (4 g each). The jars were sealed inside the glove box and transferred to an Retsch PM100 planetary ball mill. The materials were ball milled at 400 rpm for ten minutes. There was a one-minute pause for every two minutes to allow heat to dissipate. After ball milling the jar was returned to the glove box and unsealed. The resulting dark gray powder was sieved through a 200-mesh screen. This reacted material was used as a diluter material for a larger reaction in the next step.

Next, 2.0 g $SnF_2$ was combined with 0.21 g SLMP and the reacted composite material. This mixture was ball milled the same way as described in the first step, returned to the glove box and sieved through a 200-mesh screen. The sieved material was then removed from the glove box for XRD (x-ray diffraction) and electrochemical testing.

Figure 1:
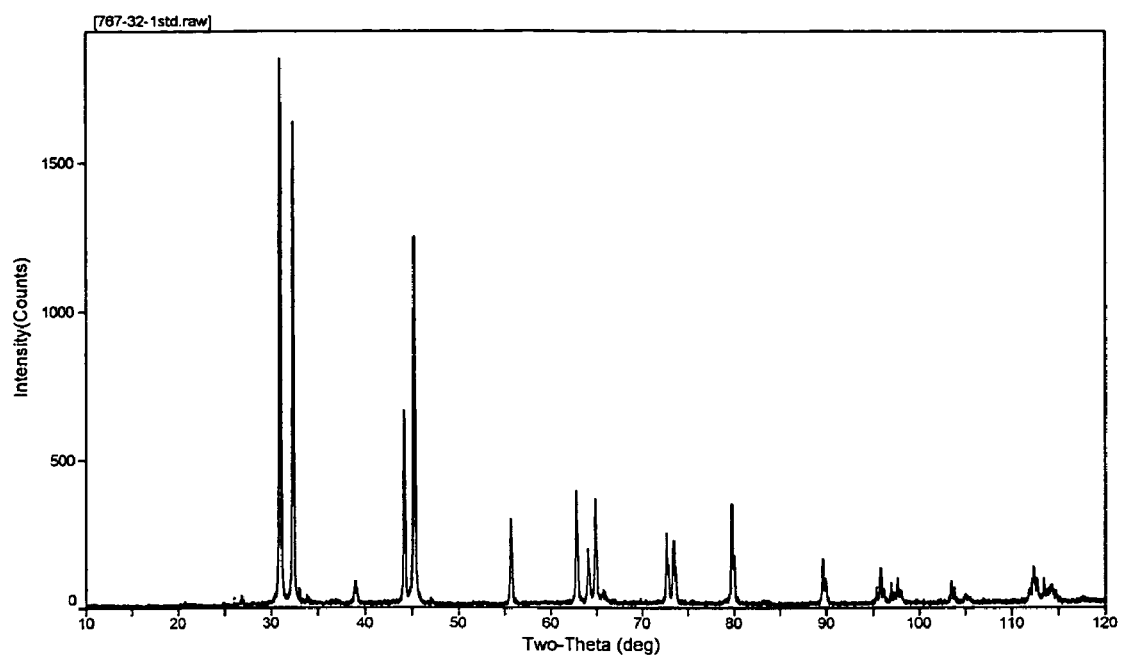
FIG. 1 illustrates an XRD pattern for the Sn:2LiF composite material of Example 1.

Phase Identification: The phase identification was carried out on a Rigaku RINT 2500 x-ray diffractometer, equipped with a rotating anode and a diffracted beam monochrometer. The sample was mounted on a zero background plate. The Cu K-alpha beam was used. As shown in FIG. 1, the main peaks of the reaction product can be indexed with LiF and Sn.

Electrochemical Testing: Electrodes of the composite powder were prepared by coating a slurry of the following composition: 85% active (sample), 10% Super P carbon black (Comilog) and 5% PVDF 461 (Atofina). The materials were combined with NMP (1-methyl-2-pyrrolidinone) to produce slurry of desired consistency. The slurry was mixed at 1000 rpm for 15 minutes and cast on copper foil treated with 1% oxalic acid. After casting the electrodes were dried at ~80° C. on a hot plate to remove solvent and then additionally dried over night at 110° C. The electrodes were punched from the dried coatings and pressed at 2000 lbs. The pressed electrodes were then dried at 110° C. under vacuum prior to cell assembly.

The 2325 coin-type cells were constructed inside an Ar filled glove box (coin cell hardware from NRC). A Celguard 3501 membrane (Hoechst Celanese) together with a piece of binder free glass wool was used as the separator. The electrolyte was 1M $LiPF_6$ (Mitsubishi Chemical Co.) dissolved in 1:1 EC/DMC and the counter electrode was lithium metal foil (FMC). Cells were tested with a constant current of 0.1 mA; charged and discharged between 1.5V and 0.0V on a Maccor Series 4000 cycler. The test electrode contained about 10 mg active material.

Figure 2:
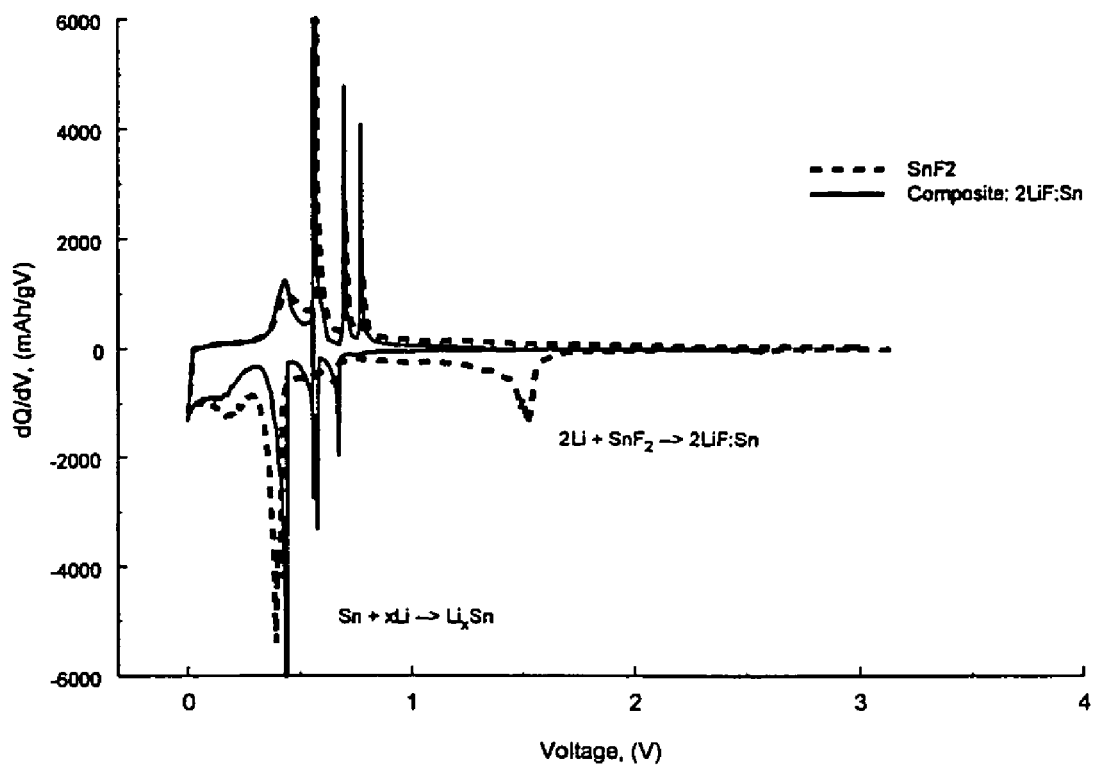
FIG. 2 illustrates a cyclic voltamogram of an electrode formed according to embodiments of the present invention and an electrode formed from tin fluoride in accordance with Example 1.

The cyclic voltamograms of the first cycle of both the Sn:2LF sample and SnF$_2$ itself are shown in FIG. 2. As shown, the peak that is due to Li reacting with SnF$_2$ to form Sn and LiF is absent from the composite Sn: 2LiF sample.

Example 2

The Sn:Li$_2$O composite was generated according to the following reaction:

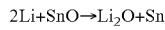

$$2Li + SnO \rightarrow Li_2O + Sn$$

Materials preparation: SnO (10 μm 99%, Aldrich) was used with stabilized lithium metal powder (SLMP) from FMC Corporation.

First, 1.0 g SnO was combined with 0.101 g SLMP. There was five percent excess in SLMP to account for the protective coating on the SLMP particle surface and thereby to insure the completion of the reaction. Materials were weighed and premixed in Argon filled glove box. Premixing was done with a soft brush to avoid initiating any reaction on contact. After premixing the materials were loaded into a 50 ml stainless steel ball mill jar along with ten 10 mm stainless steel balls (4 g each). The jars were sealed inside the glove box and transferred to an Retsch PM100 planetary ball mill. The materials were ball milled at 400 rpm for ten minutes. There was a one-minute pause for every two minutes to allow heat to dissipate. After ball milling the jar was returned to the glove box and unsealed. The resulting dark gray powder was sieved through a 200-mesh screen. This reacted material was used as a diluter material for a larger reaction in the next step.

Next, 2.0 g SnO was combined with 0.24 g SLMP and the reacted composite material. This mixture was ball milled the same way as described in the first step, returned to the glove box and sieved through a 200-mesh screen. Some of the sieved material was then removed from the glove box for XRD (x-ray diffraction).

Phase Identification: The phase identification was carried out on a Rigaku RINT 2500 x-ray diffractometer, equipped with a rotating anode and a diffracted beam monochrometer. The sample was mounted on a zero background plate. The Cu K-alpha beam was used. As shown in FIG. 3, the main peaks of the reaction product can be indexed with Li$_2$O and Sn, with very small trace amount of unreacted SnO.

Electrochemical Testing: Electrodes of the composite powder were prepared inside an Argon filled glove box by coating slurries of the composition: 85% active, 12% Super P carbon black (Comilog) and 3% SBR (Europrene R72613). SBR was pre-dissolved in p-xylene (Aldrich). Excess p-Xylene was used to produce slurry of desired consistency. The slurry was mixed at 1000 rpm for 15 minutes and cast on copper foil treated with 1% oxalic acid. After casting the electrodes were dried at ~55° C. in the glove box anti-chamber to remove solvent and additionally dried over night at 110° C. Electrodes were punched from the dried coatings.

The 2325 coin-type cells were constructed inside Argon filled glove box (coin cell hardware from NRC). A Celguard 3501 membrane (Hoechst Celanese) together with a piece of binder free glass wool was used as the separator. The electrolyte was 1M LiPF$_6$ (Mitsubishi Chemical Co.) dissolved in 1:1 EC/DMC and the counter electrode was lithium metal foil (FMC). Cells were tested with a constant current of 0.1 mA; charged and discharged between 1.5V and 0.0V on a Maccor Series 4000 cycler. The test electrode contained about 7 mg active material.

The cyclic voltamograms of the first cycle of both the Sn:Li$_2$O sample and SnO itself are shown in FIG. 4. As shown, the peak that is due to Li reacting with SnO to form Sn and Li$_2$O is absent from the composite Sn:Li$_2$O sample.

Example 3

The Sn:2Li$_2$O composite was generated according to the following reaction:

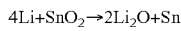

$$4Li + SnO_2 \rightarrow 2Li_2O + Sn$$

Materials preparation: SnO$_2$ (99.9%, Aldrich) was used with stabilized lithium metal powder (SLMP) from FMC Corporation.

First, 1.0 g SnO$_2$ was combined with 0.19 g SLMP. There was five percent excess in SLMP to account for protective coating on the SLMP particles surface and thereby to insure the completion of the reaction. Materials were weighed and premixed in an Argon filled glove box. Premixing was done with a soft brush to avoid initiating any reaction on contact. After premixing the materials were loaded into a 50 ml stainless steel ball mill jar along with ten 10 mm stainless steel balls (4 grams each). The jars were sealed inside the glove box and transferred to an Retsch PM100 planetary ball mill. The materials were ball milled at 400 rpm for ten minutes. There was a one-minute pause for every two minutes to allow heat to dissipate. After ball milling the jar was returned to the glove box and unsealed. The resulting dark gray powder was sieved through a 200-mesh screen. This reacted material was used as a diluter material for a larger reaction in the next step.

Next, 2.0 g SnO2 was combined with 0.4 g SLMP and the reacted composite material. This mixture was ball milled the same way as described in the first step, returned to the glove box and sieved through a 200-mesh screen. Some of the sieved material was then removed from the glove box for XRD (x-ray diffraction)

Phase Identification: The phase identification was carried out on a Rigaku RINT 2500 x-ray diffractometer, equipped with a rotating anode and a diffracted beam monochrometer. The sample was mounted on a zero background plate. The Cu K alpha beam was used. As shown in FIG. 5, the main peaks of the reaction product can be indexed with Li$_2$O and Sn.

Electrochemical Testing: Electrodes of the composite powder were prepared inside an Argon filled glove box by coating a slurry of the following composition: 85% active (sample), 12% Super P carbon black (Comilog) and 3% SBR (styrene-butadiene rubber) (Europrene R72613). SBR was pre-dissolved in p-Xylene (Aldrich). Excess p-Xylene was used to produce a slurry of desired consistency. The slurry was mixed at 1000 rpm for 15 minutes and cast on copper foil treated with 1% oxalic acid. After casting the electrodes were dried at ~55° C. in the heated glove box anti-chamber to remove solvent and additionally dried over night at 110° C. anti-chamber. The electrodes were punched from the dried coatings.

The 2325 coin-type cells were constructed inside an Ar filled glove box (coin cell hardware from NRC). A Celguard 3501 membrane (Hoechst Celanese) together with a piece of binder free glass wool was used as the separator. The electrolyte was 1M LiPF$_6$ (Mitsubishi Chemical Co.) dissolved in 1:1 EC/DMC and the counter electrode was lithium metal foil (FMC). Cells were tested with a constant current of 0.1 mA;

charged and discharged between 1.5V and 0.0V on a Maccor Series 4000 cycler. The test electrode contained about 18 mg active material.

The cyclic voltamograms of the first cycle of both the Sn:2Li$_2$O sample and SnO$_2$ itself are shown in FIG. 6. As shown, the peak that is due to Li reacting with SnO$_2$ to form Sn and Li$_2$O is absent from the composite Sn:2Li$_2$O sample.

Example 4

The Si:Sn:2LiF:Li$_2$O composite was generated according to the following reaction:

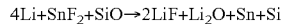
$$4Li + SnF_2 + SiO \rightarrow 2LiF + Li_2O + Sn + Si$$

Materials preparation: SnF$_2$ (99%, Aldrich) and SiO (−325 mesh Aldrich) was used with stabilized lithium metal powder (SLMP) from FMC Corporation.

First, 2.8 g SnF$_2$ and 0.8 g SiO were combined with 0.53 g SLMP. There was five percent excess in SLMP to account for the protective coating on the SLMP particle surface and thereby to insure the completion of the reaction. Materials were weighed and premixed in an Argon filled glove box. Premixing was done with a soft brush to avoid initiating any reaction on contact. After premixing the materials were loaded into a 50 ml stainless steel ball mill jar along with ten 10 mm stainless steel balls (4 g each). The jars were sealed inside the glove box and transferred to an Retsch PM100 planetary ball mill. The materials were ball milled at 400 rpm for ten minutes. There was a one-minute pause for every two minutes to allow heat to dissipate. After ball milling the jar was returned to the glove box and unsealed. The resulting dark gray powder was sieved through a 200-mesh screen. Some of the sieved material was then removed from the glove box for XRD (x-ray diffraction).

Phase Identification: The phase identification was carried out on a Rigaku RINT 2500 x-ray diffractometer, equipped with a rotating anode and a diffracted beam monochrometer. The sample was mounted on a zero background plate. The Cu K-alpha beam was used. As shown in FIG. 7, the main peaks of the reaction product can be indexed with Sn, Si, LiF and Li$_2$O.

Electrochemical Testing: Electrodes of the composite powder were prepared inside an Argon filled glove box by coating a slurry of the following composition: 85% active (sample), 12% Super P carbon black (Comilog) and 3% SBR (styrene-butadiene rubber) (Europrene R72613). SBR was pre-dissolved in p-Xylene (Aldrich). Excess p-Xylene was used to produce slurry of desired consistency. The slurry was mixed at 1000 rpm for 15 minutes and cast on copper foil treated with 1% oxalic acid. After casting the electrodes were dried at ~55° C. in the heated glove box anti-chamber to remove solvent and additionally dried over night at 110° C. The electrodes were punched from the dried coatings.

The 2325 coin-type cells were constructed inside an Ar filled glove box (coin cell hardware from NRC). A Celguard 3501 membrane (Hoechst Celanese) together with a piece of binder free glass wool was used as the separator. The electrolyte was 1M LiPF6 (Mitsubishi Chemical Co.) dissolved in 1:1 EC/DMC and the counter electrode was lithium metal foil (FMC). Cells were tested with a constant current of 0.1 mA; charged and discharged between 1.5V and 0.0V on a Maccor Series 4000 cycler. The test electrode contained about 7.5 mg active material.

The cyclic voltamogram of the first cycle of the Sn:Si: 2LiF:Li$_2$O composite sample is shown in FIG. 8. As shown, the peaks due to Li reacting with SnF$_2$ and SiO respectively to form Sn, Si, LiF and Li$_2$O are absent.

Example 5

The 3Si:Li$_4$SiO$_4$ composite was generated according to the following reaction:

$$4Li + 4SiO \rightarrow Li_4SiO_4 + 3Si$$

Materials preparation: SiO (−325 mesh, Aldrich) was used with stabilized lithium metal powder (SLMP) from FMC Corporation.

1.0 g SiO combined with 0.17 g SLMP. There was five percent excess in SLMP to account for the protective coating on the SLMP particle surface and thereby to insure the completion of the reaction. Materials were weighed and mixed in an Argon filled glove box. Premixing was done with a soft brush to avoid initiating any reaction on contact. After premixing the materials were transferred to an alumina mortar. The reaction was initiated by grinding the material with an alumina pestle. The resulting dark gray powder was sieved through 200 mesh screen. The sieved material was then removed from the glove box for XRD (x-ray diffraction).

Phase Identification: The phase identification was carried out on a Rigaku RINT 2500 x-ray diffractometer, equipped with a rotating anode and a diffracted beam monochrometer. The sample was mounted on a zero background plate. The Cu K-alpha beam was used. As shown in FIG. 9, the main peaks of the reaction product can be indexed with Si and Li$_4$SiO$_4$.

When the above sample preparation procedure was repeated with larger Li to SiO ratio, XRD detected peaks belonging to lithium silicon alloy phase, at the expense of the Si peaks.

When the above sample preparation procedure was repeated with smaller Li to SiO ratio, the XRD peaks belonging to Si and Li$_4$SiO$_4$ were smaller, with visible peaks belonging to the unreacted SiO.

Having thus described certain embodiments of the present invention, it is to be understood that the invention defined by the appended claims is not to be limited by particular details set forth in the above description as many apparent variations thereof are possible without departing from the spirit or scope thereof as hereinafter claimed. The following claims are provided to ensure that the present application meets all statutory requirements as a priority application in all jurisdictions and shall not be construed as setting forth the full scope of the present invention.

What is claimed is:

1. A compound, comprising silicon and/or tin nano-dispersed within a lithium-containing framework formed from a stabilized lithium metal powder.

2. The compound of claim 1, wherein the compound is single phase or multi-phase.

3. The compound of claim 1, wherein the compound is selected from the group consisting of Si:Li$_2$O, Si:2Li$_2$O, Si:3Li$_2$O, and SiSn:3Li$_2$O.

4. The compound of claim 1, wherein the compound comprises a compound represented by the formula Sn$_{1-x}$Si$_x$: αLi$_2$O, wherein $0 \leq x \leq 1$ and $1 \leq \alpha \leq 3$.

5. The compound of claim 1, wherein the compound comprises a compound represented by the formula Sn$_{1-x}$Si$_x$: αLi$_2$O+γSn$_{1-y}$Si$_y$:βLi$_2$O, wherein $0 \leq x \leq 1$, $1 \leq \alpha \leq 3$, $0 \leq y \leq 1$, $1 \leq \beta \leq 3$, and $0 < \gamma < 1$.

6. The compound of claim 1, wherein the compound is single phase or multi-phase.

* * * * *

UNITED STATES PATENT AND TRADEMARK OFFICE
CERTIFICATE OF CORRECTION

PATENT NO.        : 8,231,810 B2
APPLICATION NO.   : 11/106225
DATED             : July 31, 2012
INVENTOR(S)       : Gao et al.

Page 1 of 1

It is certified that error appears in the above-identified patent and that said Letters Patent is hereby corrected as shown below:

Column 6, Line 37: Correct "$0 \leqq y \leqq 1$." to read -- $0 < y < 1$. --

Signed and Sealed this
Eighteenth Day of December, 2012

David J. Kappos
*Director of the United States Patent and Trademark Office*